US012794407B2

(12) United States Patent
Grant

(10) Patent No.: US 12,794,407 B2
(45) Date of Patent: Nov. 10, 2026

(54) PHOTOVOLTAIC ASSEMBLY FOR A PORTABLE SOLAR ENERGY SYSTEM

(71) Applicant: CEP-IP LTD, Cambridge (GB)

(72) Inventor: Thomas McGregor James Grant, Cambridgeshire (GB)

( * ) Notice: Subject to any disclaimer, the term of this patent is extended or adjusted under 35 U.S.C. 154(b) by 0 days.

(21) Appl. No.: 18/691,577

(22) PCT Filed: Sep. 13, 2022

(86) PCT No.: PCT/EP2022/075373
§ 371 (c)(1),
(2) Date: Mar. 13, 2024

(87) PCT Pub. No.: WO2023/036998
PCT Pub. Date: Mar. 16, 2023

(65) Prior Publication Data

US 2024/0396493 A1 Nov. 28, 2024

(30) Foreign Application Priority Data

Sep. 13, 2021 (EP) .................................... 21196429

(51) Int. Cl.
*H02S 30/20* (2014.01)
*H02S 40/36* (2014.01)

(52) U.S. Cl.
CPC .............. *H02S 30/20* (2014.12); *H02S 40/36* (2014.12)

(58) Field of Classification Search
CPC ............. F24S 2025/012; F24S 2025/80; F24S 2025/801; F24S 2025/804; F24S 25/10; F24S 25/16; F24S 25/20; F24S 25/65; F24S 25/67; F24S 25/70; H02S 30/10; H02S 30/20; H02S 30/00
See application file for complete search history.

(56) References Cited

FOREIGN PATENT DOCUMENTS

| | | | | |
|---|---|---|---|---|
| CN | 106877801 A | * | 6/2017 | ............. H02S 20/30 |
| EP | 2398065 A2 | * | 12/2011 | ............. F24S 25/12 |

OTHER PUBLICATIONS

English machine translation of CN 106877801 published Jun. 20, 2017.*

* cited by examiner

*Primary Examiner* — Christina Chern
(74) *Attorney, Agent, or Firm* — Eugenio J. Torres-Oyola; Victor M. Rodriguez-Reyes; Rafael Rodriguez-Muriel

(57) ABSTRACT

The present invention discloses a photovoltaic assembly for a portable solar energy system, the photovoltaic assembly comprising: a row of interconnected photovoltaic panels or laminates; a foldable stiffening and/or supporting structure comprising articulated members, the foldable stiffening and/or supporting structure being movable between a folded position, in which the articulated members are received in a receiving zone provided in the photovoltaic assembly, and an operative position, in which the foldable stiffening and/or supporting structure protrudes out from the receiving zone; and wherein the receiving zone comprises at least one intermediate region located adjacent to contiguous longitudinal side edges of adjacent photovoltaic panels or laminates, said intermediate region being configured to receive therein in the folded position one or more of the articulated members of the stiffening and/or supporting structure. The photovoltaics panels or laminates are interconnected by at least a first connection pin and/or by at least one intermediate beam.

14 Claims, 10 Drawing Sheets

PHOTOVOLTAIC ASSEMBLY FOR A PORTABLE SOLAR ENERGY SYSTEM

TECHNICAL FIELD

The present invention relates to the field of portable solar energy systems. In particular, the present invention relates to the field of photovoltaic assemblies which ease the transport and installation of photovoltaic panels or laminates (photovoltaic surface without a complete peripheral frame) for a solar energy collection system.

The invention provides a photovoltaic assembly for a portable solar system.

BACKGROUND ART

Photovoltaic panels or laminates are widely used to generate electricity from sunlight. Photovoltaic panels or laminates are usually fixed on surfaces like roofs, building facades, on the ground, etc. using supporting structures, which may be known as photovoltaic mounting systems or solar module racking, among others.

A solar panel performs the best when its surface is substantially perpendicular to the sun's rays, which change continuously over the course of the day and season. The supporting structures of the photovoltaic panels or laminates are also often used to orientate the photovoltaic panels or laminates in regard to solar radiation to maximize their energy production. Said supporting structure may be fixed, i.e., the photovoltaic panels or laminates have a fixed orientation, or may tilt, i.e., the orientation of the photovoltaic panels or laminates may vary depending on the position of the sun.

A solar energy system typically comprises one or more photovoltaic assemblies, which typically comprise one or more photovoltaic panels or laminates and a supporting structure.

Photovoltaic assemblies are usually installed at locations remote from its manufacturing site. Consequently, there is a need to transport the energy system components from their manufacturing site to the installation site where they will be assembled. Therefore, it is advantageous to provide a solar energy system that can be assembled in optimal conditions off-site and easily transported, as this can provide a significant cost reduction, among other benefits.

Besides being transported from the manufacturing site, or any intermediate storage site, to the location where the solar energy system is to be installed, the photovoltaic assemblies need to be mounted or installed. Consequently, it is advantageous if the photovoltaic assemblies of a solar energy system can be easily installed, as this can provide a significant time and cost reduction, an increase in worker safety, etc.

WO 2010/098806 A1 discloses a photovoltaic assembly comprising an array of photovoltaic laminates supported on a perimetral frame formed by top and bottom beams, side beams, and intermediate beams shared between two photovoltaic laminates, and a stiffening device formed by interconnected profiles. The stiffening device is configured to be transitioned between an operative position, in which the stiffening device protrudes from a lower side of the photovoltaic assembly and provides support and strengthening thereto, and a folded position, in which the stiffening device is maintained in its entirety within a receiving zone defined by the perimetral frame of the photovoltaic assembly. Said receiving zone is disclosed to have a height of no more than 8 inches thereby facilitating transport of the photovoltaic assembly.

BRIEF DESCRIPTION OF THE INVENTION

In order to provide a photovoltaic assembly for a solar energy system which can be easily transported, assembled and, if necessary, disassembled, to be transported to a further location, the present invention discloses a photovoltaic assembly for a portable solar energy system, the photovoltaic assembly comprising: a row of interconnected photovoltaic panels or laminates; a foldable stiffening and/or supporting structure comprising articulated members, the foldable stiffening and/or supporting structure being movable between a folded position, in which the articulated members are received in a receiving zone provided in the photovoltaic assembly, and an operative position, in which the foldable stiffening and/or supporting structure protrudes out from the receiving zone; and wherein the receiving zone comprises at least one intermediate region located adjacent to contiguous longitudinal side edges of adjacent photovoltaic panels or laminates, said intermediate region being configured to receive therein in the folded position one or more of the articulated members of the stiffening and/or supporting structure.

According to the present invention, it is accepted that part of the stiffening and/or supporting structure may protrude from the receiving zone although it is preferred that it protrudes minimally to reduce the space required for the transport of the photovoltaic assembly.

According to the present invention, the photovoltaic panels or laminates may be interconnected by at least a first connection pin parallel to major surfaces of the photovoltaic panels or laminates and perpendicular to the longitudinal side edges of the photovoltaic panels or laminates, and the articulated members may comprise a first articulated member having an end portion pivotally connected to said first connection pin.

According to the present invention, the articulated members may further comprise a second articulated member having an end portion pivotally connected to said first connection pin.

According to the present invention, the photovoltaic panels or laminates may be further interconnected by a second connection pin parallel to the first connection pin, and the articulated members may further comprise a third articulated member having an end portion pivotally connected to said second connection pin.

According to the present invention, at least one of the articulated members may define a longitudinal channel configured to receive therein at least one of the other articulated members in the folded position of the stiffening and/or supporting structure.

According to the present invention, the photovoltaic assembly, and in particular, the stiffening and/or supporting structure, may further comprise at least one intermediate beam arranged in at least one of the intermediate regions, each intermediate beam being joined to adjacent longitudinal side edges of the photovoltaic panels or laminates, and the at least one intermediate beam may comprise a support section configured to support the adjacent longitudinal side edges of the adjacent photovoltaic panels or laminates and a receiving section defining a longitudinal channel configured to receive therein one or more of the articulated members in the folded position of the stiffening and/or supporting structure, the receiving section of the intermediate beam contributing to at least part of the receiving zone.

According to the present invention, the photovoltaic panels or laminates may have a front side and a back side, and the longitudinal channel defined by the receiving section may be open at one side of the intermediate beam corresponding to the back side of the photovoltaic panels or laminates.

According to the present invention, the longitudinal channel defined by the receiving section of the intermediate beam may comprise a bottom wall parallel to major surfaces of the photovoltaic panels or laminates and mutually facing side walls extending from the bottom wall.

According to the present invention, the support section of the intermediate beam may be formed adjacent to the bottom wall on the side opposing the receiving zone.

According to the present invention, the support section may be attached to the internal and to the external major surface of two adjacent photovoltaic laminates.

According to the present invention, the support section may comprise a T-shaped member extending from the bottom wall on the side opposing the receiving zone, said T-shaped member together with the bottom wall on the side opposing the receiving zone defining two grooves for the reception of side edges of adjacent laminates, said side edges being preferably provided with a protective cover.

According to the present invention, the support section may be defined by an auxiliary member attached to the bottom wall on the side opposing the receiving zone, said auxiliary member defining two grooves for the reception of side edges of adjacent laminates, said side edges being preferably provided with a protective cover.

According to the present invention, the support section may be defined by auxiliary members, each auxiliary member being clipped to a corresponding projection extending parallel to the bottom wall on the side opposing the receiving zone, each auxiliary member together with the corresponding projection defining a groove for the reception of the side edge of the corresponding laminate, said side edge being preferably provided with a protective cover.

According to the present invention, the support section may further comprise a stop between the auxiliary members for limiting their movement.

According to the present invention, the support section of the intermediate beam may be formed by support walls parallel to the bottom wall extending outwards from ends of the side walls farthest from the bottom wall.

According to the present invention, the articulated members may comprise a first articulated member having an end portion pivotally connected to the side walls of the receiving section of the intermediate beam by a first pivot pin parallel to the bottom wall.

According to the present invention, the articulated members may comprise a second articulated member, and the first articulated member may define a longitudinal channel which is open at one side thereof corresponding to the back side of the photovoltaic panels or laminates and configured to receive therein the second articulated member in the folded position.

According to the present invention, the second articulated member may have one end portion pivotally connected to the intermediate beam or to the first articulated member by a second pivot pin parallel to the first pivot pin.

According to the present invention, the articulated members may comprise a third articulated member, and the second articulated member may define a longitudinal channel which is open at one side which corresponds to the back side of the photovoltaic panels or laminates and configured to receive therein the third articulated member in the folded position.

According to the present invention, the third articulated member may have one end portion pivotally connected to the intermediate beam or to the first articulated member or to the second articulated member by a third pivot pin parallel to the bottom wall.

It will be understood that references to geometric position, such as parallel, perpendicular, tangent, etc. allow deviations up to ±5° from the theoretical position defined by this nomenclature.

It will also be understood that any range of values given may not be optimal in extreme values and may require adaptations of the invention to these extreme values are applicable, such adaptations being within reach of a skilled person.

Other features of the invention appear from the following detailed description of an embodiment.

BRIEF DESCRIPTION OF THE FIGURES

The foregoing and other advantages and features will be more fully understood from the following detailed description of an embodiment with reference to the accompanying drawings, to be taken in an illustrative and non-limitative manner, in which.

DETAILED DESCRIPTION OF AN EMBODIMENT

The foregoing and other advantages and features will be fully understood from the following detailed description of an embodiment with reference to the accompanying drawings, to be taken in an illustrative and not limitative way.

Figure 1:
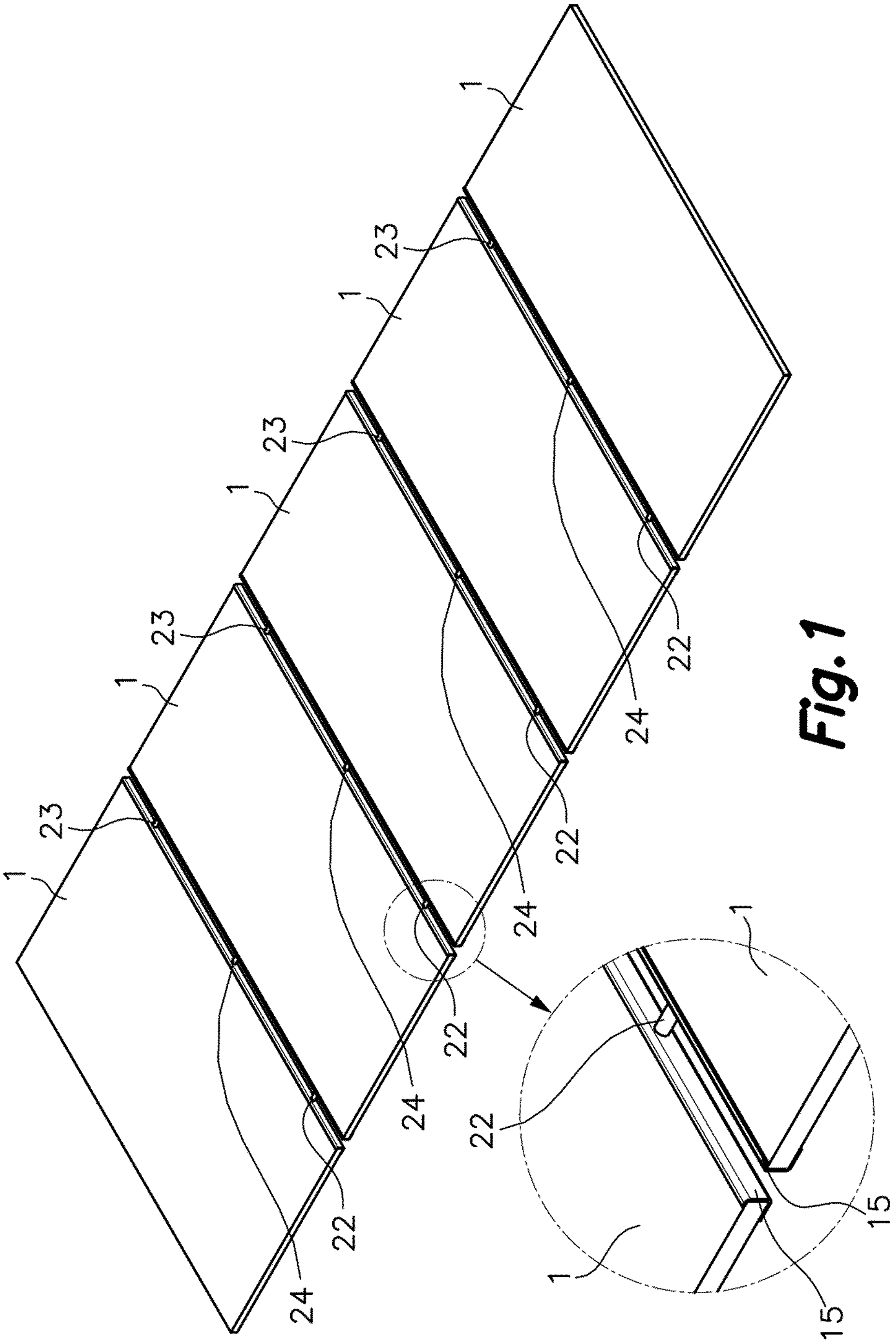
FIG. 1 shows a perspective and a detail view of a first exemplary embodiment of a photovoltaic assembly for a portable solar energy system including a row of interconnected photovoltaic panels, according to the present invention.

FIG. 1 shows in a perspective view a first exemplary embodiment of a photovoltaic assembly for a portable solar energy system according to the present invention. The photovoltaic assembly of this exemplary embodiment comprises a row of interconnected photovoltaic panels 1. In this embodiment, an intermediate region is defined between adjacent photovoltaic panels 1, which are interconnected by first 22, second 23 and third 24 connection pins. However, in other embodiments the photovoltaic panels 1, and in particular, the perimeter frames 15 of the photovoltaic panels 1, may be interconnected by a different number of connection pins 22, 23, 24, for example, only two. The first 22, second 23 and third 24 connection pins are parallel to major surfaces of the photovoltaic panels 1 and perpendicular to the longitudinal side edges of the photovoltaic panels 1.

In the first exemplary embodiment shown, the photovoltaic assembly comprises five photovoltaic panels 1. However, other embodiments may comprise a different number of photovoltaic panels 1, as for example, two, three, four, six, etc, and in general any number of panels compatible with an easy transport.

In other embodiments the photovoltaic panels 1 may be replaced by photovoltaic laminates 1. Although it is not considered optimal, some embodiments could comprise both photovoltaic panels 1 and photovoltaic laminates 1.

FIG. 1 also shows a detail view of the intermediate region located adjacent to longitudinal side edges of adjacent photovoltaic panels 1 of the first exemplary embodiment of a photovoltaic assembly.

Figure 2:
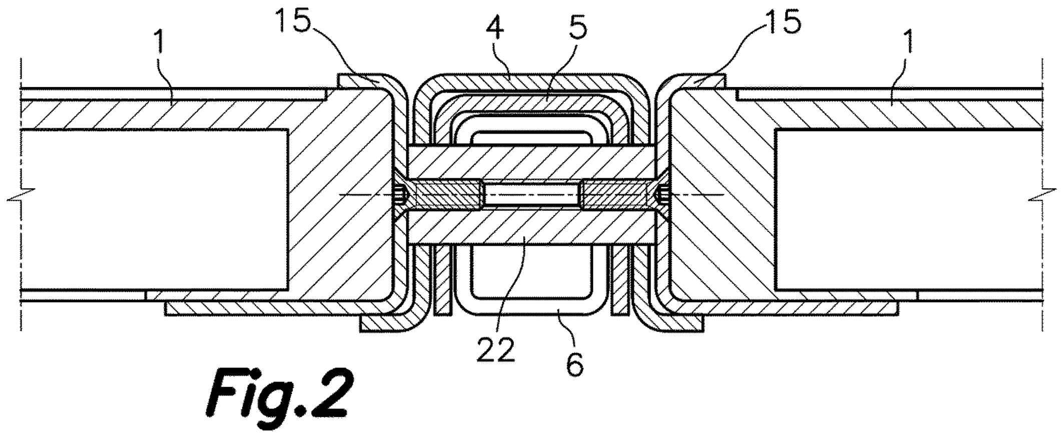
FIG. 2 shows a section view of the exemplary embodiment of a photovoltaic assembly based on the row of interconnected photovoltaic panels shown in FIG. 1.

Said intermediate region is shown in greater detail in FIG. 2 according to this first exemplary embodiment. In particular, FIG. 2 shows a section view of the intermediate region and adjacent photovoltaic panels 1 of the exemplary embodiment of a photovoltaic assembly shown in FIG. 1. In FIG. 2. the first connection pin 22 that interconnects two longitudinal side edges of contiguous photovoltaic panels 1 can be seen. Said connection pin 22 can be connected directly to the perimeter frame 15 of the photovoltaic panel 1 or to a connection element which is attached to the perimeter frame 15 of the corresponding photovoltaic panel 1. The same applies to the other connection pins 23, 24. In FIG. 2 the articulated members 4, 5, 6 of the stiffening and/or supporting structure 3 (see, for example, FIGS. 4 and 5) are depicted in the folded position wherein said articulated members 4, 5, 6 are substantially received within the intermediate region between panels 1, thus providing a very compact assembly when in its folded position, very favourable for transport.

Figure 3:
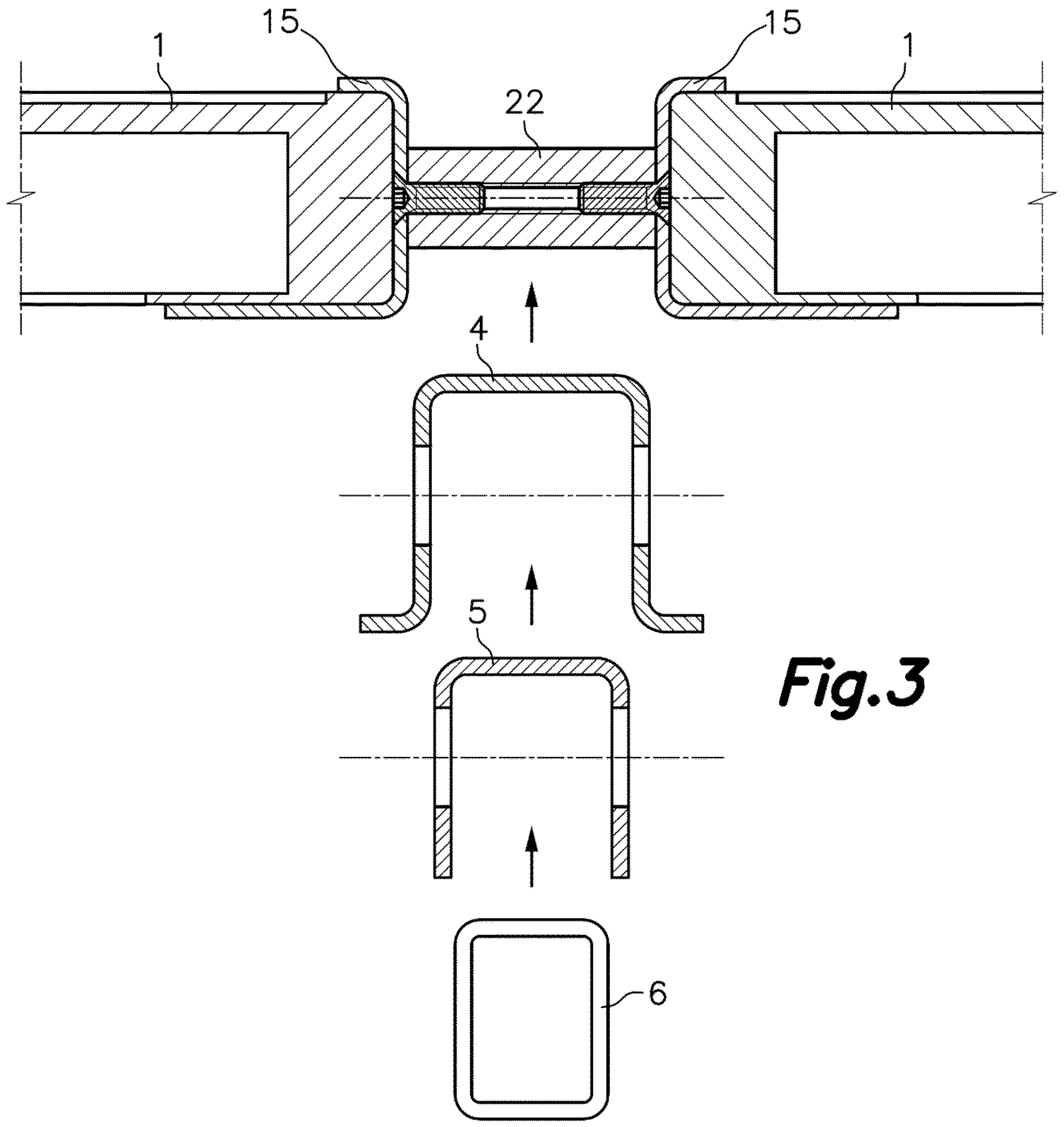
FIG. 3 shows an exploded section view of the exemplary embodiment of a photovoltaic assembly shown in FIG. 2.

FIG. 3 shows an exploded section view of the exemplary embodiment of a photovoltaic assembly shown in FIGS. 1 and 2. FIG. 3 is similar to FIG. 2 but with the articulated members 4, 5, 6 of the stiffening and/or supporting structure 3 (see, for example, FIGS. 4 and 5) in an exploded configuration. The first articulated member 4 is pivotally connected to the first connection pin 22 at one of its ends. In this embodiment, the first articulated member 4 defines a longitudinal channel configured to receive therein the second articulated member 5 in the folded position of the stiffening and/or supporting structure 3 (see FIG. 2). In the embodiment shown, the first articulated member 4 has an omega shaped cross section, i.e., a cross section being U-shaped with added lateral flanges. However, in other embodiments the first articulated member 4 may have other cross sections.

In the embodiment shown, the second articulated member 5 defines a longitudinal channel configured to receive therein the third articulated member 6 in the folded position of the stiffening and/or supporting structure 3 (see FIG. 2). In the embodiment shown, the second articulated member 5 has a U-shaped cross section. However, in other embodiments the second articulated member 5 may have other cross sections. Said third articulated member 6, in this embodiment, has a rectangular cross section and, therefore, does not define a longitudinal channel. However, in other embodiments the third articulated member 6 may have a different cross section and may define a longitudinal channel which is open at one side thereof.

Although the first exemplary embodiment has been depicted with three articulated members 4, 5, 6, other embodiments may have a different number of articulated members, such as two, four, etc.

Figure 4:
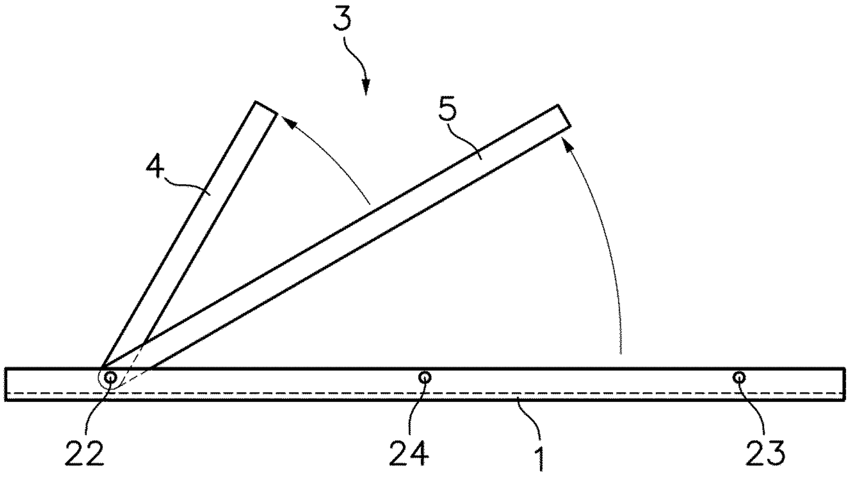
FIG. 4 shows a profile view of a first configuration of the exemplary embodiment of a photovoltaic assembly shown in FIG. 2, illustrating some articulated members providing a foldable stiffening and/or supporting structure.
Figure 5:
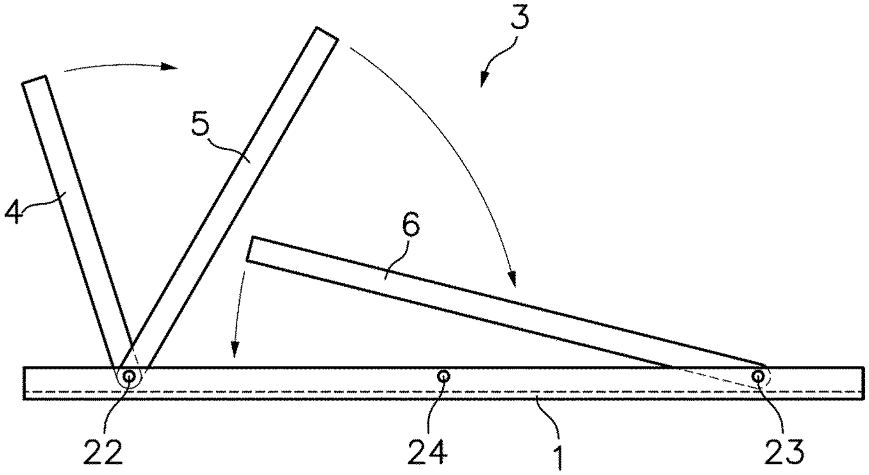
FIG. 5 shows a profile view of a second arrangement of the articulated members providing a foldable stiffening and/or supporting structure of the exemplary embodiment of a photovoltaic assembly shown in FIG. 2.

FIGS. 4 and 5 show a profile view of a first and a second configurations, respectively, of the first exemplary embodiment of a photovoltaic assembly shown in FIG. 1 with some of the articulated members deployed.

In this exemplary embodiment, the first and second articulated members 4, 5 have an end portion pivotally connected to the first connection pin 22, whereas the third articulated member 6 has an end portion pivotally connected to the second connection pin 24.

In the first configuration of FIG. 4 the third articulated member 6 is still in its folded position, while the first and second articulated members 4, 5 are being placed in their operative position, in which they protrude from the receiving zone defined by the intermediate region between adjacent photovoltaic panels 1 (see FIG. 1), to provide a stiffening and/or supporting structure.

In the second configuration of FIG. 5 the first, second and third articulated members 4, 5, 6 are being placed in their unfolded position. The third articulated member 6 is received in the intermediate region located adjacent to contiguous longitudinal side edges of adjacent photovoltaic panels 1 and the second articulated member 5 is being placed in its folded position by receiving in its longitudinal channel the third articulated member 6. Similarly, the second articulated member 5 is received in the longitudinal channel of the first articulated member 4.

Figure 6:
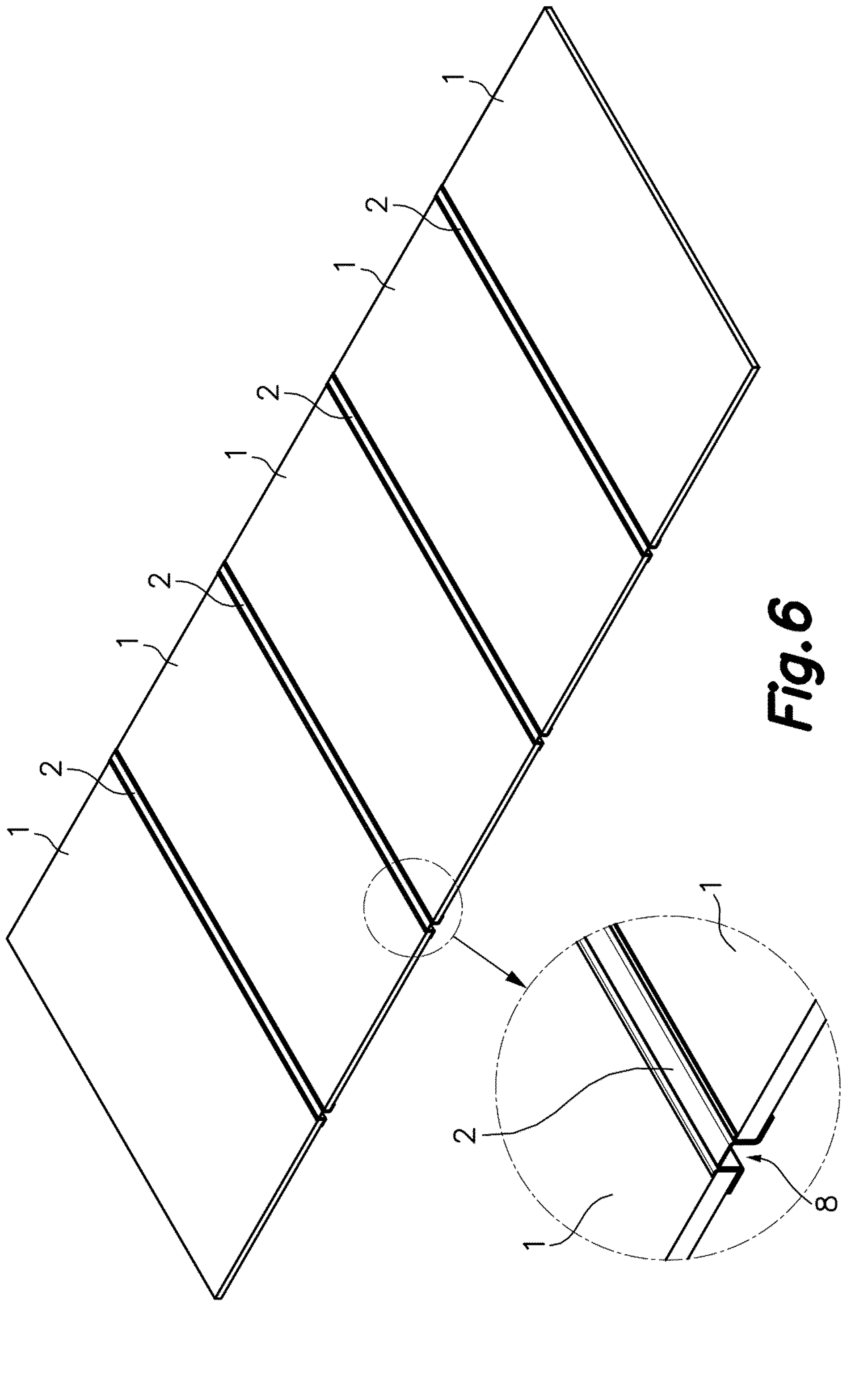
FIG. 6 shows a perspective and a detail view of a second exemplary embodiment of a photovoltaic assembly for a portable solar energy system according to the present invention with indication only of the cited intermediate beams arranged in the intermediate regions between photovoltaic panels.

FIG. 6 shows a perspective and a detail view of a second exemplary embodiment of a photovoltaic assembly for a portable solar energy system according to the present invention. The photovoltaic assembly of this second exemplary embodiment comprises intermediate beams 2 arranged in the intermediate regions located adjacent to longitudinal side edges of adjacent photovoltaic panels 1. Said intermediate beams comprise a receiving section 8 configured to receive therein one or more of the articulated members 4, 5, 6 in the folded position of the stiffening and/or supporting structure 3 (see, for example, FIGS. 12 to 15).

The receiving section 8 comprised in the beam 2 can be seen in greater detail in the detail view also shown in FIG. 6.

In this second exemplary embodiment shown, the photovoltaic assembly comprises five photovoltaic panels 1. However, other embodiments may comprise a different number of photovoltaic panels 1, as for example, two, three, four, six, etc.

Figure 7:
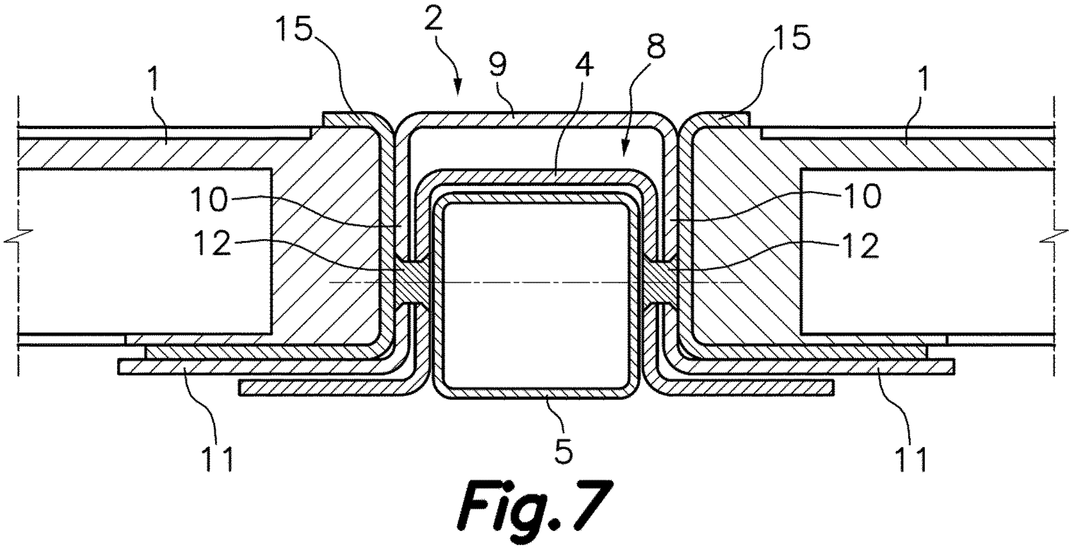
FIG. 7 shows a section view of second the exemplary embodiment of a photovoltaic assembly shown in FIG. 6 with the inclusion of the articulated members providing a stiffening and/or supporting structure.

FIG. 7 shows a section view of the second exemplary embodiment of a photovoltaic assembly shown in FIG. 6. This section view shows in greater detail the receiving section 8 comprised in the intermediate beam 2 arranged in the intermediate region located adjacent to longitudinal side edges of adjacent photovoltaic panels 1 and attached to said longitudinal sided edges, e.g., by adhesive. In FIG. 7 the articulated members 4, 5, 6 are depicted in its folded position, i.e., received in the receiving section 8. As can be seen, in this folded position the articulated members 4, 5, 6 are substantially within the receiving section, thus providing a very compact arrangement which eases the transport of the photovoltaic assembly and increases the quantity of photovoltaic assemblies that can be placed, for example, in a transport container, thus improving its transport density.

Figure 8:
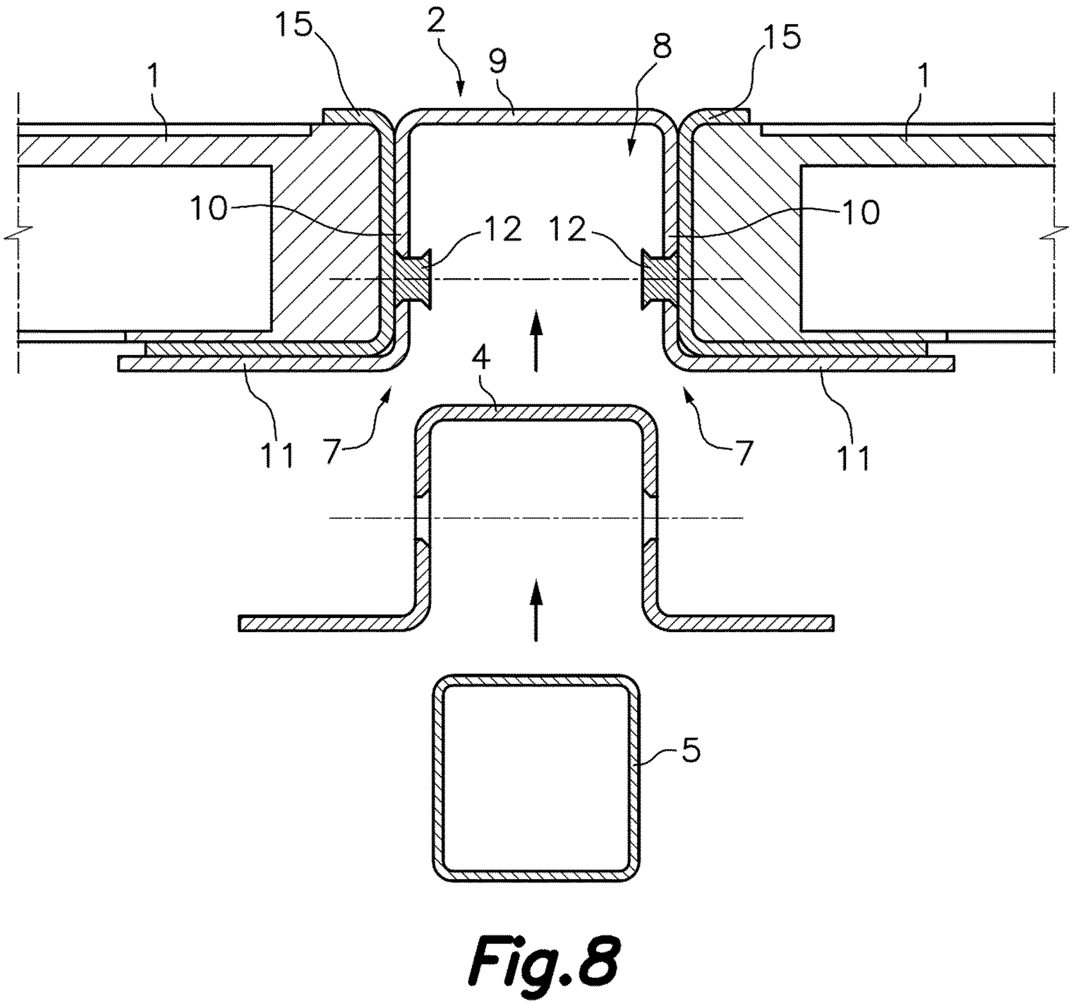
FIG. 8 shows an exploded section view of the exemplary embodiment of a photovoltaic assembly shown in FIG. 7.

The first pivot pins 12, wherein the first articulated member 4 is pivotally connected at one of its ends, can also be seen in FIG. 7, although they can be seen in greater detail in FIG. 8. In this exemplary embodiment, the first pivot pins 12 are attached to the perimeter frame 15 of the photovoltaic panel 1 at one of the ends thereof.

FIG. 8 shows an exploded section view of the second exemplary embodiment of a photovoltaic assembly shown in FIG. 7. FIG. 8 is similar to FIG. 7 but with articulated members 4, 5, 6 of the stiffening and/or supporting structure 3 (see, for example, FIGS. 12 to 15) in an exploded configuration. The first articulated member 4 is pivotally connected to the first pivot pins 12. In this second embodiment shown, the pivot pin 12 comprises two separate pins, each one on opposite side faces of the intermediate beam 2. However, in other embodiments said pivot pin 12 may be a single longitudinal pin, similar to the one shown in FIGS. 2 and 3. The first articulated member 4 defines a longitudinal channel which is open at one side thereof corresponding to the back side of the photovoltaic panel 1 and is configured to receive therein the second articulated member 5 in the folded position (see FIG. 7). In this embodiment, the first articulated member 4 has an omega-shaped cross section, although in other embodiments said first articulated member 4 can have a different cross section, such as, U-shaped, for example. Similarly, the intermediate beam 2 of the exemplary embodiment shown has an omega-shaped cross section, but in other embodiments said cross section can have a different shape, as long as it is suitable to comprise a receiving section for the reception therein of one or more of the articulated members 4, 5, 6 in the folded position of the stiffening and/or supporting structure 3.

FIG. 8 also shows the longitudinal channel defined by the receiving section 8, which comprises a bottom wall 9 parallel to major surfaces of the photovoltaic panel 1 and mutually facing side walls 10 extending from said bottom wall 9.

In the exemplary embodiment shown, the intermediate beam 2 further comprises a support section 7 for supporting the longitudinal side edges of the adjacent photovoltaic panels 1. Said support section 7 is formed by support walls 11 parallel to the bottom wall 9 extending outwards from ends of the side walls 10 farthest, or opposite, from the bottom wall 9.

The second articulated member 5 has one end portion pivotally connected to the first articulated member 4, although in other embodiments said articulated member 5 may be pivotally connected to the intermediate beam 2 at one of its ends. The second articulated member 5 lacks a longitudinal channel open at one side thereof as, in the embodiment shown, there is no further articulated member to be received therein. However, in other embodiments the second articulated member 5 may also comprise a longitudinal channel open at one side thereof for the reception of an articulated member of the stiffening and/or supporting structure 3.

Although the second exemplary embodiment has been depicted with three articulated members 4, 5, 6, other embodiments may have a different number of articulated members, such as two, four, etc.

Figure 9:
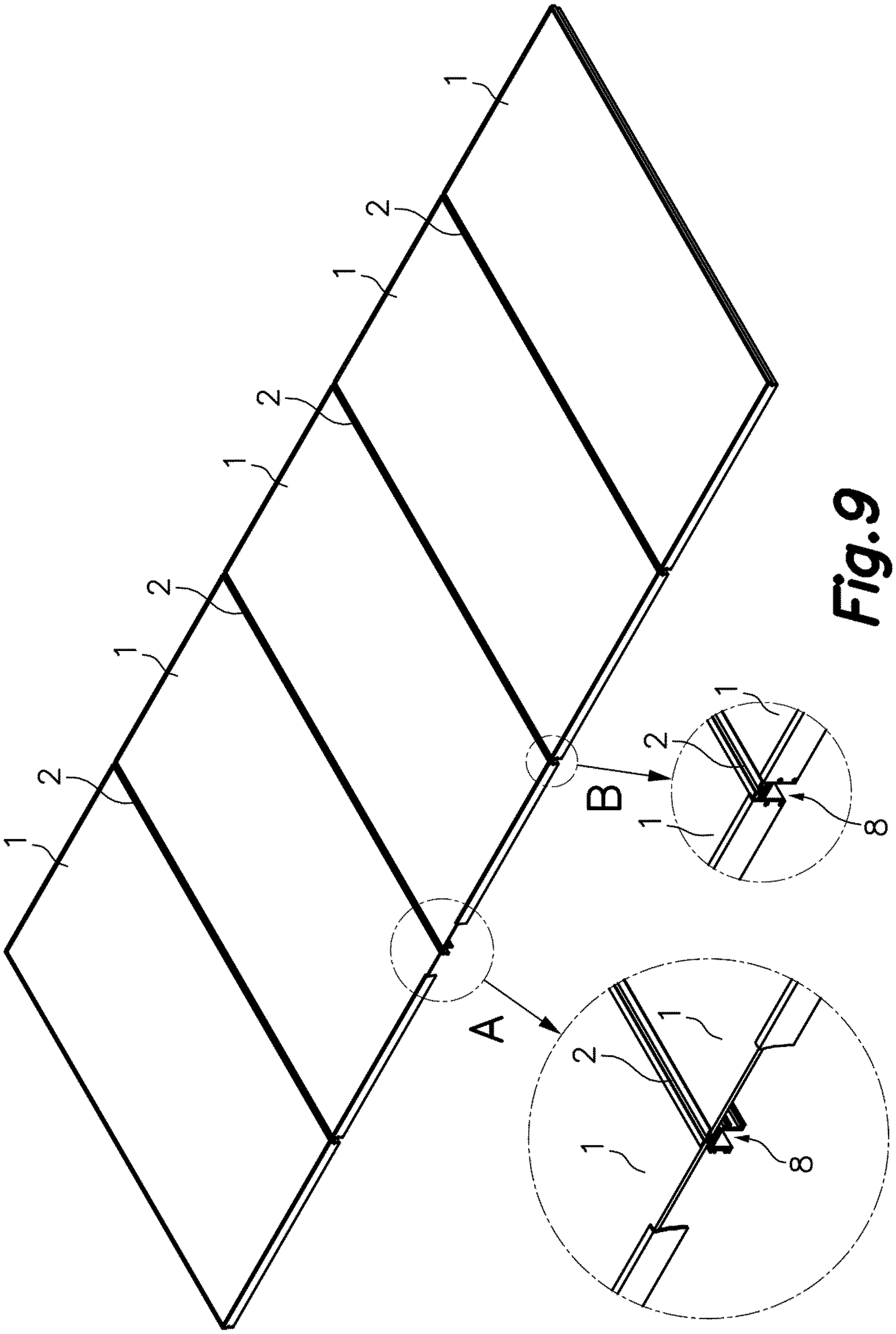
FIG. 9 shows a perspective and two detail views of a third exemplary embodiment of a photovoltaic assembly for a portable solar energy system according to the present invention.

FIG. 9 shows a perspective and two detail views of a third exemplary embodiment of a photovoltaic assembly for a portable solar energy system according to the present invention. This third exemplary embodiment shows that the transverse side edges of the photovoltaic panels 1 can reach the intermediate beam 2, see detail view B, or can reach a position so that there is a gap from the end of the transverse side edge and the intermediate beam 2, as can be seen in detail view A.

Figure 10:
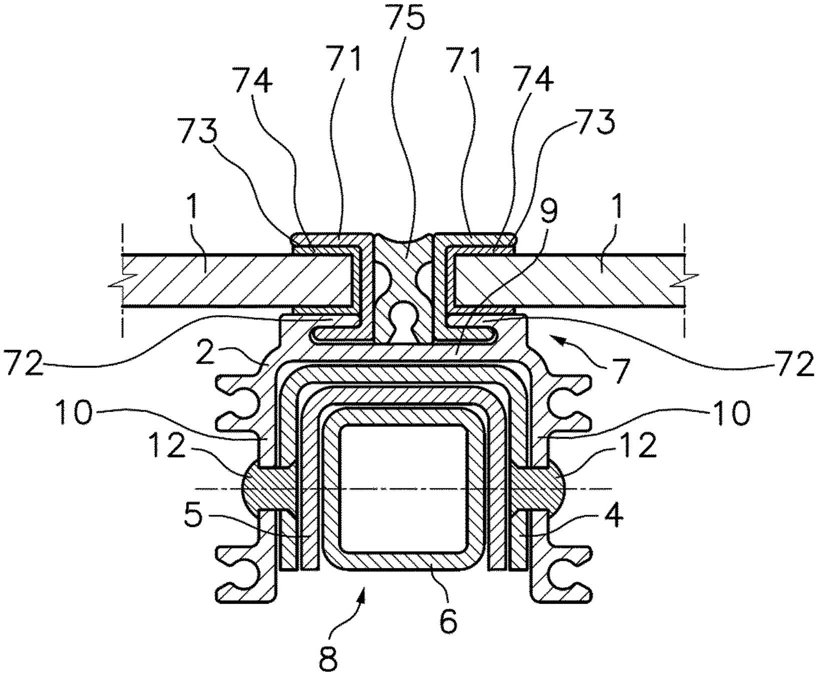
FIG. 10 shows a section view of a fourth exemplary embodiment of a photovoltaic assembly for a portable solar energy system comprising a row of laminates, according to the present invention.

FIG. 10 shows a section view of a fourth exemplary embodiment of a photovoltaic assembly for a portable solar energy system according to the present invention. Said fourth exemplary embodiment also comprises an intermediate beam 2, as the second and third exemplary embodiments previously described, but the fourth exemplary embodiment comprises a photovoltaic laminate 1 instead of photovoltaic panels as the exemplary embodiments previously described.

The intermediate beam 2 arranged in the intermediate region located adjacent to longitudinal side edges of adjacent photovoltaic laminates 1 comprises a support section 7 for supporting the adjacent photovoltaic laminates 1 and a receiving section 8 for the reception therein of the articulated members 4, 5, 6 in the folded position of the stiffening and/or supporting structure. In the present embodiment, the longitudinal channel defined by the receiving section 8 comprises a bottom wall 9 parallel to major surfaces of the photovoltaic laminates 1 and mutually facing side walls 10 extending from the bottom wall. Said support section 7 is formed adjacent to the bottom wall 9 on the side opposing the receiving zone 8.

In this exemplary embodiment, the support section 7 is defined by auxiliary members 71, each auxiliary member 71 being clipped to a corresponding projection 72 extending parallel to the bottom wall 9 on the side opposing the receiving zone 8. In other embodiments, the auxiliary member 71 may be permanently attached to the bottom wall 9 on the side opposing the receiving zone, for example, by a weld or a suitable glue.

In this embodiment, each auxiliary member 71 together with the corresponding projection 72 define a groove 73 for the reception of the side edge of the corresponding laminate 71. In this embodiment, the grooves 73 are substantially C-shaped. However, in other embodiments they may have a different shape.

In the exemplary embodiment shown, the side edge of the laminate 71 is provided with a protective cover 74. Although the presence of a protective cover 74 is preferred, as it protects the laminate 1 from being damaged due to, for example, the clamping or fixing force, vibrations, etc., other embodiments may lack of such protective cover 74. It is also possible that a photovoltaic assembly according to the present invention comprises some laminates 1 with a protective cover 74 and some without it.

The exemplary embodiment shown also comprises a stop 75 for limiting the movement of the auxiliary members 71. The depicted stop 75 is a separate or external part removably attached to the photovoltaic assembly. However, in other embodiments such stop 75 can be a part integral with the photovoltaic assembly.

Other embodiments may comprise a T-shaped member extending from the bottom wall 9 on the side opposing the receiving zone 8, said T-shaped member together with said bottom wall 9 defining two grooves 73 for the reception of side edges of adjacent laminates 1.

Each side wall 10 of this fourth exemplary embodiment comprises a pivot pin 12. However, in other embodiment said pivot pin 12 can be a single piece longitudinal pin, similar to the one shown in FIGS. 2 and 3.

Figure 11:
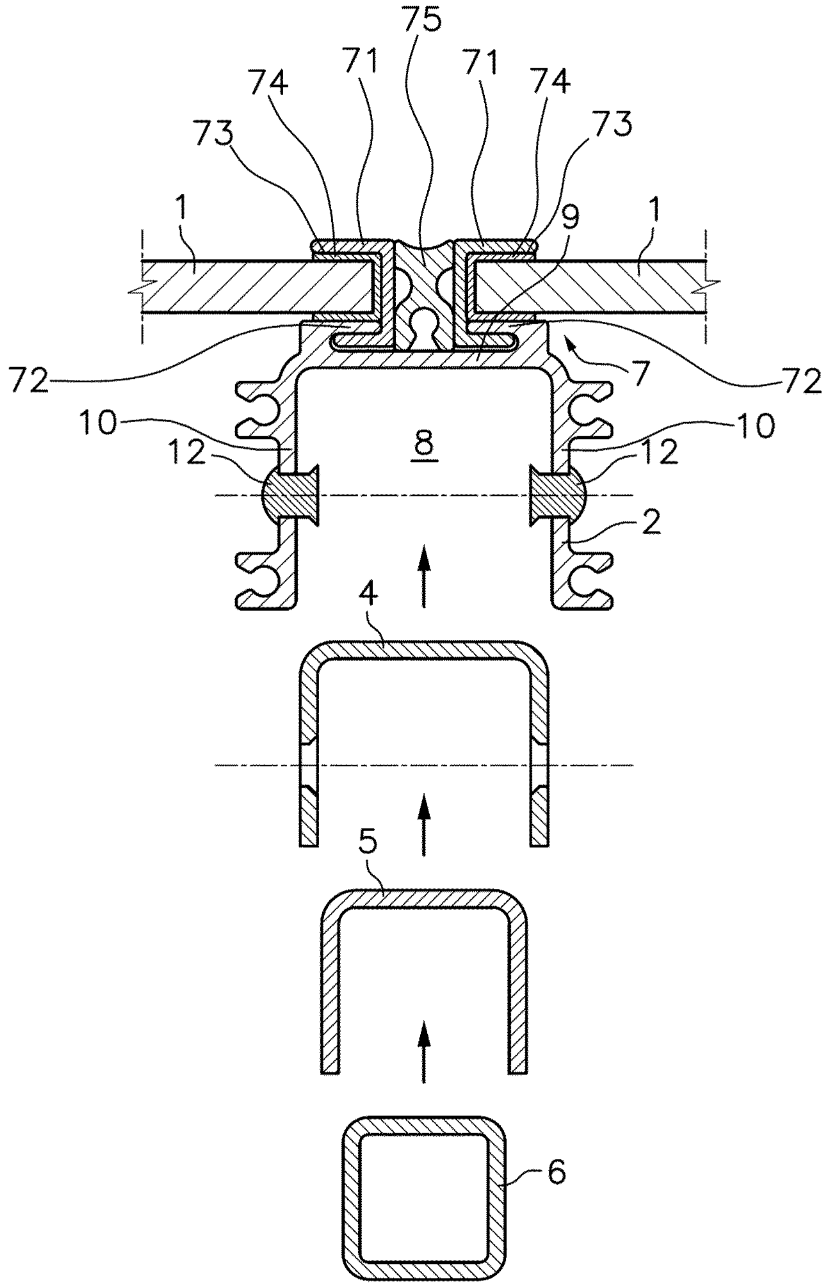
FIG. 11 shows an exploded section view of the exemplary embodiment of a photovoltaic assembly shown in FIG. 10.

FIG. 11 shows an exploded section view of the fourth exemplary embodiment of a photovoltaic assembly shown in FIG. 10. FIG. 11 is similar to FIG. 10 but with the articulated members 4, 5, 6 of the stiffening and/or supporting structure 3 (see, for example, FIGS. 12 to 15) in an exploded configuration. The first articulated member 4 is pivotally connected to the first pivot pins 12 at one of its ends and defines a longitudinal channel which is open at one side thereof configured to receive therein the second articulated member 5 in the folded position of the stiffening and/or supporting structure 3. Said first articulated member 4 has a U-shaped cross section, although in other embodiments said cross section can have a different shape.

In this fourth exemplary embodiment the second articulated member 5 is pivotally connected to the first articulated member 4 at one of its ends and defines a longitudinal channel open at one side thereof for the reception of a third articulated member 6. However, in other embodiments said second articulated member 5 can be pivotally connected to the intermediate beam 2 instead of to the first articulated member 4. Said second articulated member 5 has a U-shaped cross section, although in other embodiments said cross section can have a different shape.

The third articulated member 6, in this fourth exemplary embodiment, is pivotally connected at one end portion of the second articulated member 5. In particular, is connected to the end of the second articulated member 5 opposite the one pivotally connected to the first articulated member 4 (see, for example, FIG. 14). As can be seen, in this fourth exemplary embodiment, the third articulated member 5 has a closed cross section, that is to say, lacks a longitudinal channel that is open at one side thereof for the reception of an articulated member. A closed cross section has the advantage that the articulated member has a higher structural integrity, and therefore, can withstand higher loads than members having an open, or non-closed, cross section.

Although this fourth exemplary embodiment has been depicted with three articulated members 4, 5, 6, other embodiments may have a different number of articulated members, such as two, four, etc.

FIGS. 12 to 15 show different configurations of the articulated members of the stiffening and/or supporting structure 3 of different exemplary embodiments of a portable solar energy system according to the present invention. Any of these stiffening and/or supporting structures 3 can be employed in the previous referred embodiments.

Figure 12:
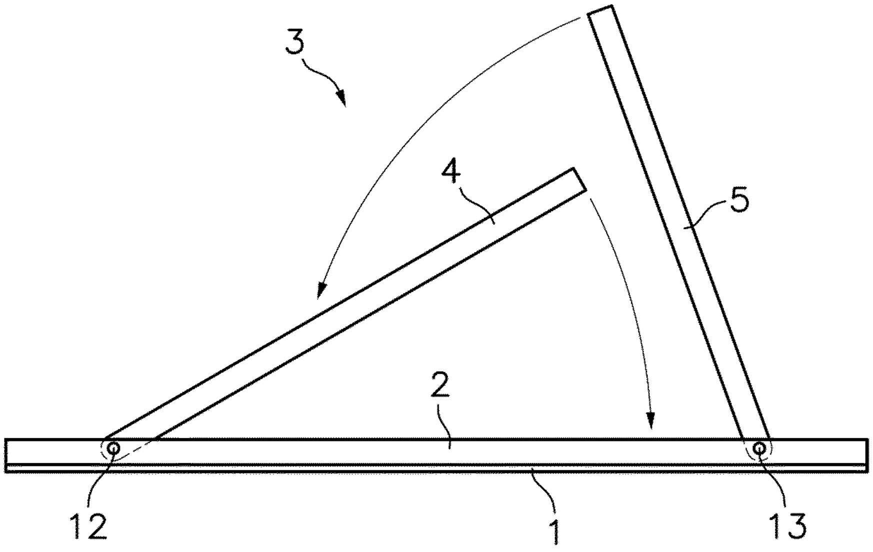
FIGS. 12 to 15 show a profile view of possible embodiments of the foldable stiffening and/or supporting structure comprising articulated members, in an unfolded situation, providing further exemplary embodiments. Any of these stiffening and/or supporting structures can be employed in the previous referred embodiments.

FIG. 12 shows schematically a profile view of a first configuration of a fifth exemplary embodiment of a photovoltaic assembly for a portable solar energy system according to the present invention. In this exemplary embodiment a first articulated member 4 is pivotally connected at one of its ends to an intermediate beam 2 via a first pivot pin 12 and a second articulated member 5 is pivotally connected at one of its ends to the intermediate beam 2 via a second pivot pin 13. Said first and second pivot pins 12, 13 are located on opposite end regions of the intermediate beam 2.

When in the folded position of the stiffening and/or supporting structure 3, the second articulated member 5 is received on a longitudinal channel which is open at one side thereof defined by the first articulated member 4.

Figure 13:
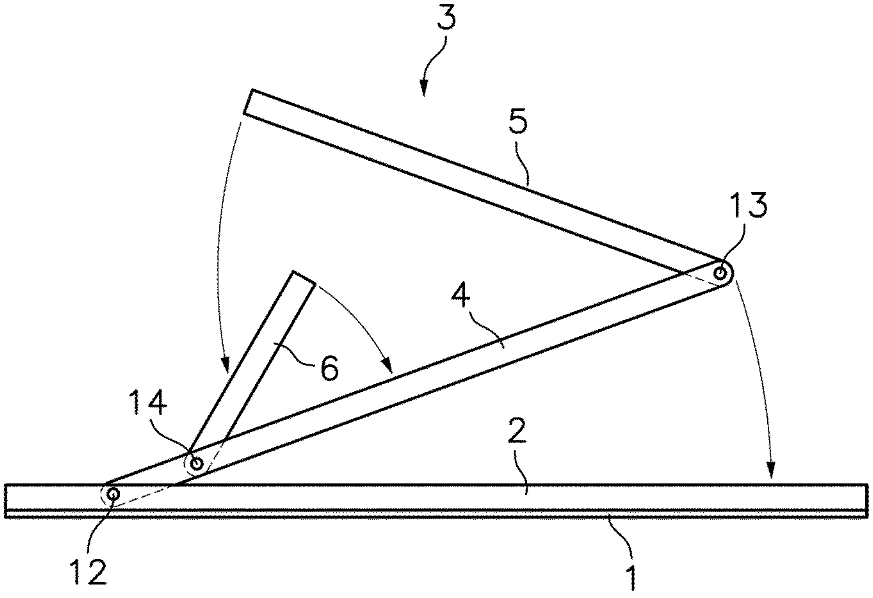

FIG. 13 shows schematically a profile view of a first configuration of a sixth exemplary embodiment of a photovoltaic assembly for a portable solar energy system according to the present invention. In this exemplary embodiment a first articulated member 4 is pivotally connected to an intermediate beam 2 by means of a first pivot pin 12. At the end of the first articulated member 4 opposite the one pivotally connected to the intermediate beam 2, the stiffening and/or supporting structure 3 comprises a second pivot pin 13 that pivotally connects the first articulated member 4 with the second articulated member 5. The first articulated member 4 further comprises a third pivot pin 14, located between the first and second pivot pins 12, 13, which connects in an articulated manner the third articulated member 6 with the first articulated member 4.

In the folded position of the stiffening and/or supporting structure 3, the first articulated member 4 is received in the intermediate beam 2, the third articulated member 6 is received in the first articulated member 4 and the second articulated member 5 is received in both the first and third articulated members 4, 6.

Figure 14:
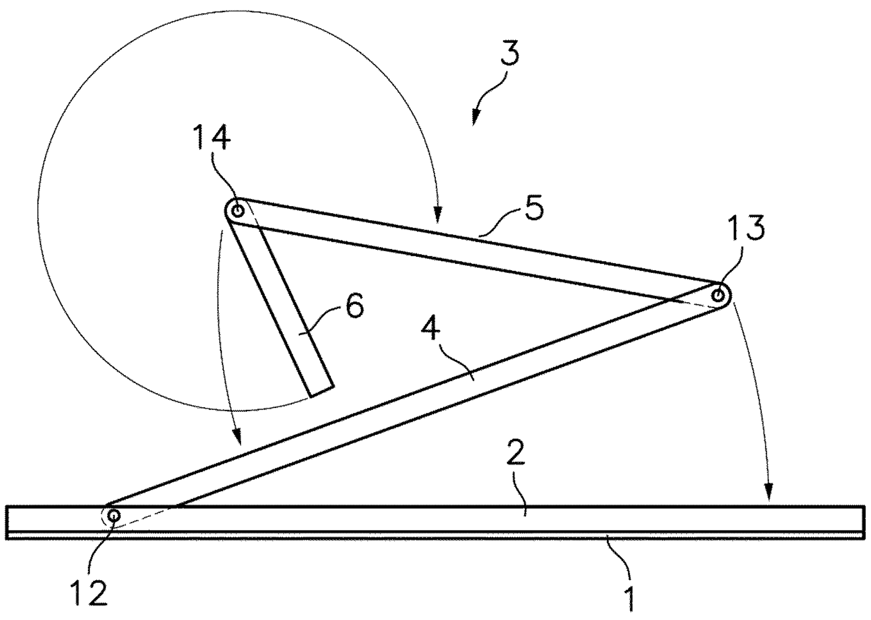

FIG. 14 shows schematically a profile view of a first configuration of a sixth exemplary embodiment of a photovoltaic assembly for a portable solar energy system according to the present invention. In this exemplary embodiment, the first articulated member 4 is pivotally connected to an intermediate beam 2 via a first pivot pin 12 at one end portion of said first articulated member 4. At the end opposite the one pivotally connected to the intermediate beam 2, the first articulated member 4 is pivotally connected to a second articulated member 5 by means of a second pivot pin 13. At the end opposite the one pivotally connected to the first articulated member 4, the second articulated member 5 is pivotally connected to a third articulated member 6 via a third pivot pin 14.

In the folded position of the stiffening and/or supporting structure 3, the first articulated member 4 is received in the intermediate beam 2, the third articulated member 6 is received in the second articulated member 5, which is received in the first articulated member 4, in the first articulated member and in the intermediate beam 2.

Figure 15:
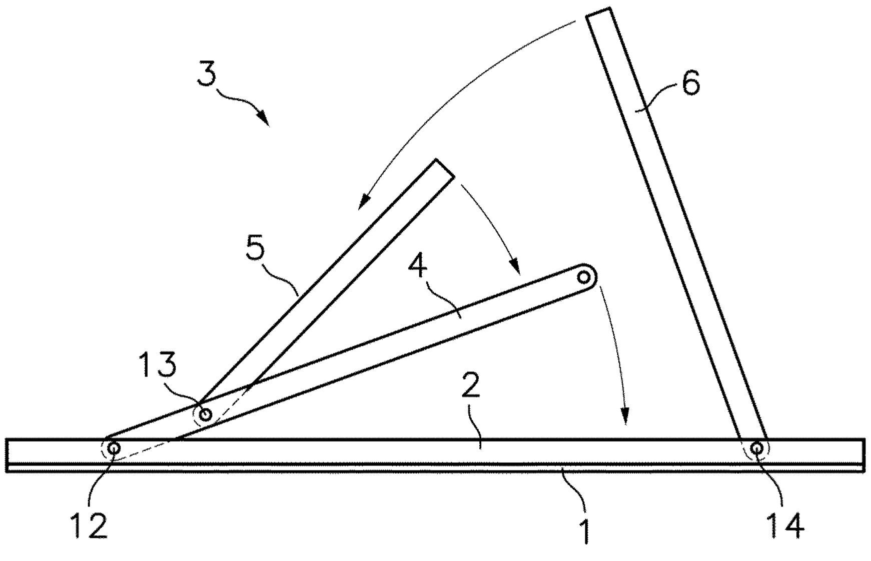

FIG. 15 shows schematically a profile view of a first configuration of a seventh exemplary embodiment of a photovoltaic assembly for a portable solar energy system according to the present invention. In this exemplary embodiment, a first articulated member is pivotally connected to an intermediate beam 2 by means of a first pivot pin 12. Said first articulated member 4 is also pivotally connected to a second articulated member via a second pivot pin 13. The stiffening and/or supporting structure 3 of the seventh exemplary embodiment further comprises a third articulated member 6 pivotally connected to the intermediate beam 2 by means of a third pivot pin 14.

In any of the above-described embodiments part of the stiffening and/or supporting structure 3 could protrude from the receiving section 8, in particular, reinforcement elements of the stiffening and/or supporting structure 3, which in its the folded position are arranged substantially parallel to the major surfaces of the photovoltaic panels or laminates 1, may slightly protrude from the receiving section 8, but still providing a compact arrangement of the photovoltaic assembly when in its folded position.

As stated above, the present invention provides a photovoltaic assembly for a portable energy system that can be easily transported and installed, thus reducing the transport and installation costs. Moreover, the photovoltaic assembly of the present invention can also be easily uninstalled, placed in its folded position, and transported to another location where it may be needed.

It will be understood that various parts of one embodiment of the invention can be freely combined with parts described in other embodiments, even being said combination not explicitly described, provided that such combination is within the scope of the claims and that there is no harm in such combination.

What is claimed is:

1. A photovoltaic assembly for a portable solar energy system, the photovoltaic assembly comprising:
- a row of interconnected photovoltaic panels;
- a foldable stiffening and/or supporting structure comprising articulated members, the foldable stiffening and/or supporting structure being movable between a folded position, in which the articulated members are received in a receiving zone provided in the photovoltaic assembly, and an operative position, in which the foldable stiffening and/or supporting structure protrudes out from the receiving zone;
- the foldable stiffening and/or supporting structure being connected to the row of interconnected photovoltaic panels in the folded position and in the operative position;
- the receiving zone comprising at least one intermediate region defined between and located adjacent to contiguous longitudinal side edges of adjacent photovoltaic panels, said at least one intermediate region being configured to receive therein in the folded position one or more of the articulated members of the stiffening and/or supporting structure;
- wherein perimeter frames of adjacent photovoltaic panels are directly interconnected by at least a first connection pin parallel to major surfaces of the photovoltaic panels and perpendicular to the longitudinal side edges of the photovoltaic panels, and wherein the articulated members comprise a first articulated member having an end portion pivotally connected to said first connection pin.

2. The photovoltaic assembly according to claim 1, wherein the articulated members further comprise a second articulated member having an end portion pivotally connected to said first connection pin.

3. The photovoltaic assembly according to claim 1, wherein the perimeter frames of the photovoltaic panels are further directly interconnected by at least a second connection pin parallel to the first connection pin, and wherein the articulated members further comprise a third articulated member having an end portion pivotally connected to said second connection pin.

4. The photovoltaic assembly according to claim 3, wherein at least one of the articulated members define a longitudinal channel configured to receive therein at least one of the other articulated members in the folded position of the stiffening and/or supporting structure.

5. A photovoltaic assembly for a portable solar energy system, the photovoltaic assembly comprising:
- a row of interconnected photovoltaic panels or laminates;
- a foldable stiffening and/or supporting structure comprising articulated members, the foldable stiffening and/or supporting structure being movable between a folded position, in which the articulated members are received in a receiving zone provided in the photovoltaic assembly, and an operative position, in which the foldable stiffening and/or supporting structure protrudes out from the receiving zone;
- the foldable stiffening and/or supporting structure being connected to the row of interconnected photovoltaic panels or laminates in the folded position and in the operative position;
- the receiving zone comprising at least one intermediate region located adjacent to contiguous longitudinal side edges of adjacent photovoltaic panels or laminates, said at least one intermediate region being configured to receive therein in the folded position one or more of the articulated members of the stiffening and/or supporting structure;
- wherein the stiffening and/or supporting structure further comprises at least one intermediate beam arranged in at least one of the at least one intermediate region, each of the at least one intermediate beam being directly joined to adjacent longitudinal side frames of the photovoltaic panels or laminates, and in that the at least one intermediate beam comprises a support section configured to support the adjacent longitudinal side frames of the adjacent photovoltaic panels or laminates and a receiving section defining a longitudinal channel configured to receive therein one or more of the articulated members in the folded position of the stiffening and/or supporting structure, the receiving section of the at least one intermediate beam providing at least part of the receiving zone.

6. The photovoltaic assembly according to claim 5, wherein the photovoltaic panels or laminates have a front side and a back side, and the longitudinal channel defined by the receiving section is open at one side of the at least one intermediate beam corresponding to the back side of the photovoltaic panels or laminates.

7. The photovoltaic assembly according to claim 5, wherein the longitudinal channel defined by the receiving section comprises a bottom wall parallel to major surfaces of the photovoltaic panels or laminates and mutually facing side walls extending from the bottom wall.

8. The photovoltaic assembly according to claim 7, wherein the support section is formed adjacent to the bottom wall on the side opposing the receiving zone.

9. The photovoltaic assembly according to claim 7, wherein the support section is formed by support walls parallel to the bottom wall extending outwards from ends of the side walls farthest from the bottom wall.

10. The photovoltaic assembly according to claim 7, wherein the articulated members comprise a first articulated member having an end portion pivotally connected to the side walls of the receiving section of the at least one intermediate beam by a first pivot pin parallel to the bottom wall.

11. The photovoltaic assembly according to claim 10, wherein the articulated members comprise a second articulated member, and the first articulated member defines a longitudinal channel which is open at one side thereof corresponding to the back side of the photovoltaic panels or laminates and configured to receive therein the second articulated member in the folded position.

12. The photovoltaic assembly according to claim 11, wherein the second articulated member has one end portion pivotally connected to the at least one intermediate beam or to the first articulated member by a second pivot pin parallel to the first pivot pin.

13. The photovoltaic assembly according to claim 11, wherein the articulated members comprise a third articulated member, and the second articulated member defines a longitudinal channel which is open at one side which corresponds to the back side of the photovoltaic panels or laminates and configured to receive therein the third articulated member in the folded position.

14. The photovoltaic assembly according to claim 13, wherein the third articulated member has one end portion pivotally connected to the at least one intermediate beam or to the first articulated member or to the second articulated member by a third pivot pin parallel to the bottom wall.

* * * * *